United States Patent [19]

Kondo et al.

[11] 4,163,530
[45] Aug. 7, 1979

[54] DEVICE FOR PREVENTING THE DRAWING-OUT OF A SEAT BELT WEBBING AT THE LOCK OF A RETRACTOR

[75] Inventors: Yutaka Kondo; Shuho Nishina, both of Toyota, Japan

[73] Assignee: Toyota Jidosha Kogyo Kabushiki Kaisha, Aichi, Japan

[21] Appl. No.: 885,333

[22] Filed: Mar. 10, 1978

[51] Int. Cl.² .................. A62B 35/00; B65H 75/48
[52] U.S. Cl. ............................ 242/107.1; 242/107.2; 280/808
[58] Field of Search .......... 242/107.1, 107.11, 107.12, 242/107.13, 107.14, 107.15, 107.2, 107.4 R, 107.4 B; 297/388; 280/744–747

[56] References Cited

U.S. PATENT DOCUMENTS

| 365,470 | 6/1887 | Griswold | 242/107.14 |
| 3,211,496 | 10/1965 | Zaydel | 242/107.12 |
| 3,287,062 | 11/1966 | Board et al. | 242/107.2 X |

Primary Examiner—Harvey C. Hornsby
Assistant Examiner—John M. Jillions
Attorney, Agent, or Firm—Stevens, Davis, Miller & Mosher

[57] ABSTRACT

Rollers are opposingly disposed at a drawing-out port for a seat belt webbing which is drawn out from a retractor. When an impact load has occurred, both the rollers are turned to tightly hold the seat webbing therebetween. Thus, a surplus length which is ascribable to the elongation and tight winding of the webbing is prevented from being drawn out.

3 Claims, 4 Drawing Figures

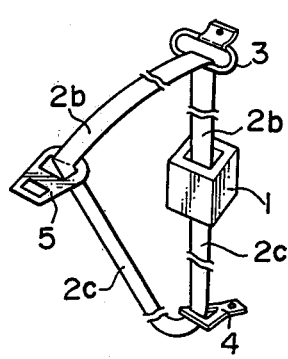
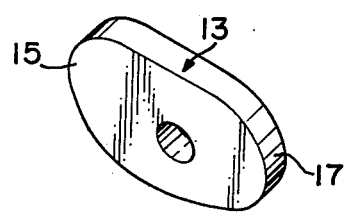
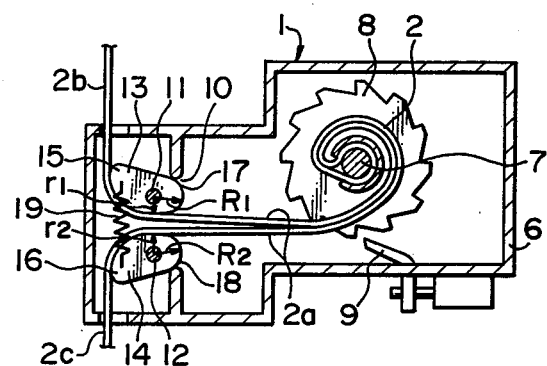
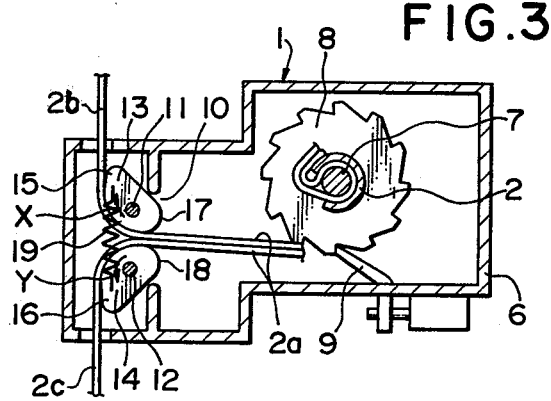

DEVICE FOR PREVENTING THE DRAWING-OUT OF A SEAT BELT WEBBING AT THE LOCK OF A RETRACTOR

This invention relates to a seat belt of the type wherein the shoulder and waist of an occupant are supported by a webbing which is drawn out from a double take-up retractor and then separated in two directions, and more particularly to a device for preventing the drawing-out of the webbing when the retractor locks.

A prior-art seat belt of the type specified above is not equipped with any device for preventing the drawing-out of the webbing when the double take-up retractor locks. Therefore, when the webbing is pulled by an impact load for retraining the occupant after the retractor has been locked by a lock mechanism under the attached state of the seat belt and at the time of the collision of a vehicle, the webbing is elongated by the load and a part thereof wound round a take-up shaft of the retractor is tightly wound by the same. Disadvantageously, the webbing is drawn out by a surplus length caused by the elongation and the tight winding.

An object of this invention is to provide a device for preventing the drawing-out of a seat belt webbing upon the locking of a retractor wherein, when the retractor is locked by a lock mechanism under the attached state of a seat belt and at the time of the collision of a vehicle and the webbing is pulled by an impact load for retraining an occupant, a surplus length component attributed to the elongation and tight winding of the webbing wound round a take-up shaft of the retractor can be prevented from being drawn out. A further object is to provide the drawing-out preventing device described above, which serves as guides for determining the drawing-out directions of the webbing in the ordinary state of use of the seat belt.

These and other objects of the invention will become more apparent in the detailed description and example which follow.

FIG. 1 is a perspective view showing the withdrawn state of the webbing of a seat belt equipped with a double take-up retractor, FIG. 2 is a side view of a drawing-out preventing device according to this invention, FIG. 3 is a side view for explaining an operating state of the device according to this invention; and FIG. 4 is a perspective view of one of the parts shown in FIGS. 2 and 3.

As shown in FIG. 1, a webbing 2a drawn out from a double take-up retractor 1 under the double state is separated and led in two directions. One webbing 2b is inserted through a first slip joint 3 which is supported by an upper fixture (not shown) in the passenger compartment of a car, while the other webbing 2c is inserted through a second slip joint 4 which is supported by a lower fixture (not shown) in the passenger compartment of the car. Both the webbings 2b and 2c are connected in an endless form, and are inserted through a through-tongue 5. The through-tongue 5 is hooked to a buckle (not shown) which is mounted on a supporter on the side of the floor of the car. Thus, a seat belt which supports the shoulder and waist of an occupant by the series of webbings is constructed.

In an embodiment illustrated in FIGS. 2 and 3, the retractor 1 comprises inside a casing 6 a take-up shaft 7, and a ratchet 8 and a pawl 9 which constitute a lock mechanism. When the vehicle has collided, the pawl 9 is brought into engagement with the ratchet 8 through a known sensor so as to lock the retractor 1.

Outside a webbing take-out port 10 of the retractor 1, a first roller 13 borne on a shaft 11 and a second roller 14 borne on a shaft 12 are opposingly disposed in a manner to hold therebetween the webbing 2a which is drawn out in the double state.

The first and second rollers 13, 14 in the illustrated embodiment are formed into such a shape that they are provided with protuberant parts 15, 16 being fore end faces which protrude as circular arc surfaces in the opposite drawing-out directions of the webbing 2a and that they have confronting surfaces of involute curves in which radii $R_1$, $R_2$ on the side of rear end faces 17, 18 closer to the take-up shaft 7 increase gradually in comparison with radii $r_1$, $r_2$ between the confronting surfaces and the shafts 11, 12 at the normal positions of the rollers. A tension spring 19 is extended between the protuberant parts 15 and 16 of the first and second rollers 13 and 14.

The sides of the protuberant parts 15, 16 of the first and second rollers 13, 14 are drawn towards each other by the tension spring 19. The spring force balances ordinary webbing drawing-out tension, so that the rollers 13, 14 can maintain the normal positions.

When the sides of the protuberant parts 15, 16 being the fore end faces are turned in directions away from each other as shown by arrows X and Y in FIG. 3, the first and second rollers 13, 14 can tightly hold the webbing 2a between the roller rear end faces 17, 18.

A device for preventing the drawing-out of the webbing 2a during the lock of the retractor is constructed of the first and second rollers 13, 14 and the tension spring 19. In the state in which the occupant attaches the seat belt, the drawing-out preventing device operates as described below. Upon the collision of the vehicle, the pawl 9 is brought into engagement with the ratchet 8, and the retractor 1 is locked. Thereafter, tensile loads in the opposite directions as exceeds loads set by the tension spring 19 act on the first and second rollers 13, 14 through the webbing 2a. Then, the first and second rollers 13, 14 have the sides of the protuberant parts 15, 16 turned in the directions away from each other against the tension spring 19 as shown in FIG. 3, and those sides of the rear end faces 17, 18 of the first and second rollers 13, 14 on which the radii $R_1$, $R_2$ increase gradually are brought between the shafts 11, 12. Finally, therefore, the webbing 2a is tightly held between the rear end faces 17, 18, and the webbing 2 wound round the take-up shaft 7 is not drawn out further. As a result, that surplus length component of the wound webbing 2 which is attributed to the elongation and tight winding thereof is prevented from being drawn out of the retractor 1.

Subsequently, when a tensile load acting on the webbing 2a becomes lower than the load set by the tension spring 19, the first and second rollers 13, 14 are automatically returned to the usual state of use illustrated in FIG. 2 under the action of the tension spring 19. In this state of use, the first and second rollers 13, 14 operate as guides which determine the drawing-out directions of the webbing 2b, 2c.

Although, in the illustrated embodiment, the first and second rollers 13, 14 are shown as ones whose opposing faces define the arcuate surfaces of the involute curves, they may of course be made as cylindrical rollers which have their axes at eccentric positions.

Owing to the construction and operation as described above in detail, when the vehicle has collided under the state under which the occupant attaches the seat belt, the retractor is locked through the lock mechanism. When the webbing has been thereafter pulled by a tensile load greater than the set load of the tension spring 19 disposed between the first and second rollers 13, 14, the first and second rollers 13, 14 are turned in the directions in which the sides of the protuberant parts 15, 16 being the fore end faces thereof turn away from each other. The first and second rollers 13, 14 tightly hold the webbing between the rear end faces 17, 18 thereof so as to prevent the webbing from being drawn out further. Therefore, the surplus length component due to the elongation and tight winding of the webbing wound round the take-up shaft 7 can be perfectly prevented from being drawn out.

Further, the first and second rollers 13, 14 which are opposingly disposed outside the webbing take-out port 10 in a manner to interpose the double webbing therebetween operate, in the ordinary state of use of the seat belt, as the guides for determining the drawing-out directions of the webbing. Therefore, the webbings placed one over the other can be precisely drawn out in the predetermined directions, respectively.

What we claim is:

1. A seat belt system comprising:
    a looped seat belt webbing;
    first and second slip joints and a through-tongue plate through which said webbing is inserted;
    a double take-up retractor about which said webbing may be wound, said retractor having a webbing take-out port;
    first and second rollers which are disposed outside said webbing take-out port of said retractor and which are opposingly and rotatably mounted on a first shaft and a second shaft provided in opposition to each other, respectively;
    the respective rollers being spaced to permit said webbing to be drawn out in a state in which said webbing is attached or wound onto said retractor, having fore end sides and rear end sides and having surfaces extending between the fore end sides and rear sides which contact with webbings drawn out in one and the other directions from the space between said first and second rollers, said surfaces being formed into circular arc surfaces which extend in the respective directions in which the webbing is drawn out through the take-out port;
    said circular arc surfaces on the rear end sides of said rollers gradually increasing in radial distance from the axes of the respective shafts in a direction from the fore end sides to the rear end sides;
    a tension spring which is extended between the fore end sides of said rollers and which draws the respective fore end sides towards each other, said tension spring having a spring force to balance the tension needed on said webbing to draw it out; and
    said webbing being tightly held between said rear end sides of said first and second rollers when said first and second rollers are turned by said webbing in directions in which their fore end faces move away from each other.

2. A seat belt system according to claim 1, wherein a casing for receiving said retractor has an edge part of the take-out port for said webbing which abuts said rear parts of said rollers, and has a roller housing for receiving said rollers, said roller housing being formed with openings through which the webbings are drawn out in said one and other directions.

3. A seat belt system comprising:
    a looped seat belt webbing;
    first and second slip joints and a through-tongue plate through which the webbing extends;
    a housing;
    a double take-up retractor about which the webbing is wound so that first and second portions of the webbing extend therefrom, said retractor being in said housing and rotatable about a first axis;
    a first roller in said housing, said roller being pivotable about an axis substantially parallel to said first axis;
    a second roller in said housing, said second roller being spaced from said first roller and being pivotable about an axis substantially parallel to said first axis;
    said first webbing portion extending from said retractor between said rollers, partially around said first roller and out of the housing in a first direction away from the second roller;
    said second webbing portion extending from said retractor between said rollers, partially around said second roller and out of the housing in a second direction away from the first roller;
    said first and second rollers having facing first and second arcuate surfaces respectively over which the first and second webbing portions extend respectively, said first and second surfaces extending from one first end of the respective first and second rollers, remote from the retractor, to a second opposite end of the respective first and second rollers closer to said retractor, said surfaces adjacent the second opposite ends of the rollers gradually increasing in radial distance from the axis of their respective rollers in a direction from the first one end to the second opposite end;
    means biasing the one end of said first and second rollers toward each other; and
    said first and second webbing portions are securely held between the second ends of the first and second rollers when they are pivoted by the first and second webbing portions in directions in which their first ends move away from each other.

* * * * *